United States Patent
Terrien et al.

(10) Patent No.: US 11,535,803 B2
(45) Date of Patent: Dec. 27, 2022

(54) METHOD FOR PURIFYING NATURAL GAS USING AN ECONOMIZER

(71) Applicants: L'Air Liquide, Société Anonyme pour l'Etude et l'Exploitation des Procédés Georges Claude, Paris (FR); Air Liquide Advanced Technologies U.S. LLC, Houston, TX (US)

(72) Inventors: Paul Terrien, Newton, MA (US); Pascal Marty, Bry sur marne (FR); Yong Ding, Waban, MA (US)

(73) Assignees: L'Air Liquide, Societe Anonyme Pour L'Etude Et L'Exploitation Des Procedes Georges Claude, Paris (FR); Air Liquide Advanced Technologies U.S. LLC, Houston, TX (US)

(*) Notice: Subject to any disclaimer, the term of this patent is extended or adjusted under 35 U.S.C. 154(b) by 398 days.

(21) Appl. No.: 16/633,273

(22) PCT Filed: Jul. 23, 2018

(86) PCT No.: PCT/FR2018/051877
§ 371 (c)(1),
(2) Date: Jan. 23, 2020

(87) PCT Pub. No.: WO2019/020917
PCT Pub. Date: Jan. 31, 2019

(65) Prior Publication Data
US 2021/0130720 A1    May 6, 2021

(30) Foreign Application Priority Data

Jul. 27, 2017  (FR) ...................................... 1757154

(51) Int. Cl.
*C10L 3/10* (2006.01)
*B01D 53/00* (2006.01)
(Continued)

(52) U.S. Cl.
CPC ............ *C10L 3/104* (2013.01); *B01D 53/002* (2013.01); *B01D 53/226* (2013.01);
(Continued)

(58) Field of Classification Search
None
See application file for complete search history.

(56) References Cited

U.S. PATENT DOCUMENTS

| | | | |
|---|---|---|---|
| 6,053,965 | A | 4/2000 | Lokhandwala |
| 6,361,582 | B1 | 3/2002 | Pinnau et al. |

(Continued)

FOREIGN PATENT DOCUMENTS

| | | |
|---|---|---|
| CA | 2 977 195 | 9/2016 |
| CA | 2 977 196 | 9/2016 |

OTHER PUBLICATIONS

Dortmundt, D. et al., Recent developments in $CO_2$ removal membrane technology, UOP LLC, Des Plaines, IL, 1999, 1-31.
(Continued)

*Primary Examiner* — Jason M Greene
(74) *Attorney, Agent, or Firm* — Justin K. Murray

(57) ABSTRACT

A process for purifying a gaseous feed stream of natural gas including methane, $CO_2$ and heavy hydrocarbons including step a): cooling the gaseous feed stream in a heat exchanger; step b): introducing the cooled stream into a phase-separating chamber to produce a liquid stream depleted in methane and enriched in heavy hydrocarbons and a gaseous stream; step c): separating the gaseous stream obtained from step b) in a first membrane producing at least one $CO_2$-enriched permeate stream and a residual stream enriched in methane; step d): introducing the residual stream obtained from step c) into a phase-separator to produce a liquid stream and a gaseous stream; step e): heating the gaseous stream obtained from step d) by introducing it into the heat exchanger used
(Continued)

in step a) counter-currentwise with the feed stream thereby producing a gaseous stream depleted in $CO_2$ and enriched in methane.

7 Claims, 1 Drawing Sheet

(51) Int. Cl.
*B01D 53/22* (2006.01)
*F25J 3/06* (2006.01)

(52) U.S. Cl.
CPC ............ *B01D 53/229* (2013.01); *F25J 3/067* (2013.01); *C10L 2290/06* (2013.01); *C10L 2290/548* (2013.01); *F25J 2205/40* (2013.01); *F25J 2205/80* (2013.01)

(56) References Cited

U.S. PATENT DOCUMENTS

| 2006/0042463 | A1* | 3/2006 | Frantz | B01D 53/226 |
| | | | | 95/49 |
| 2014/0107388 | A1 | 4/2014 | Lokhandwala et al. | |
| 2016/0231051 | A1* | 8/2016 | Shah | B01D 53/229 |
| 2018/0028965 | A1* | 2/2018 | Tanaka | B01D 53/229 |

OTHER PUBLICATIONS

International Search Report and Written Opinion for corresponding PCT/FR2018/051877, dated Nov. 2, 2018.
International Search Report and Written Opinion for related PCT/FR2018/051876, dated Jan. 29, 2019.
International Search Report and Written Opinion for related PCT/FR2018/051878, dated Jan. 31, 2019.

* cited by examiner

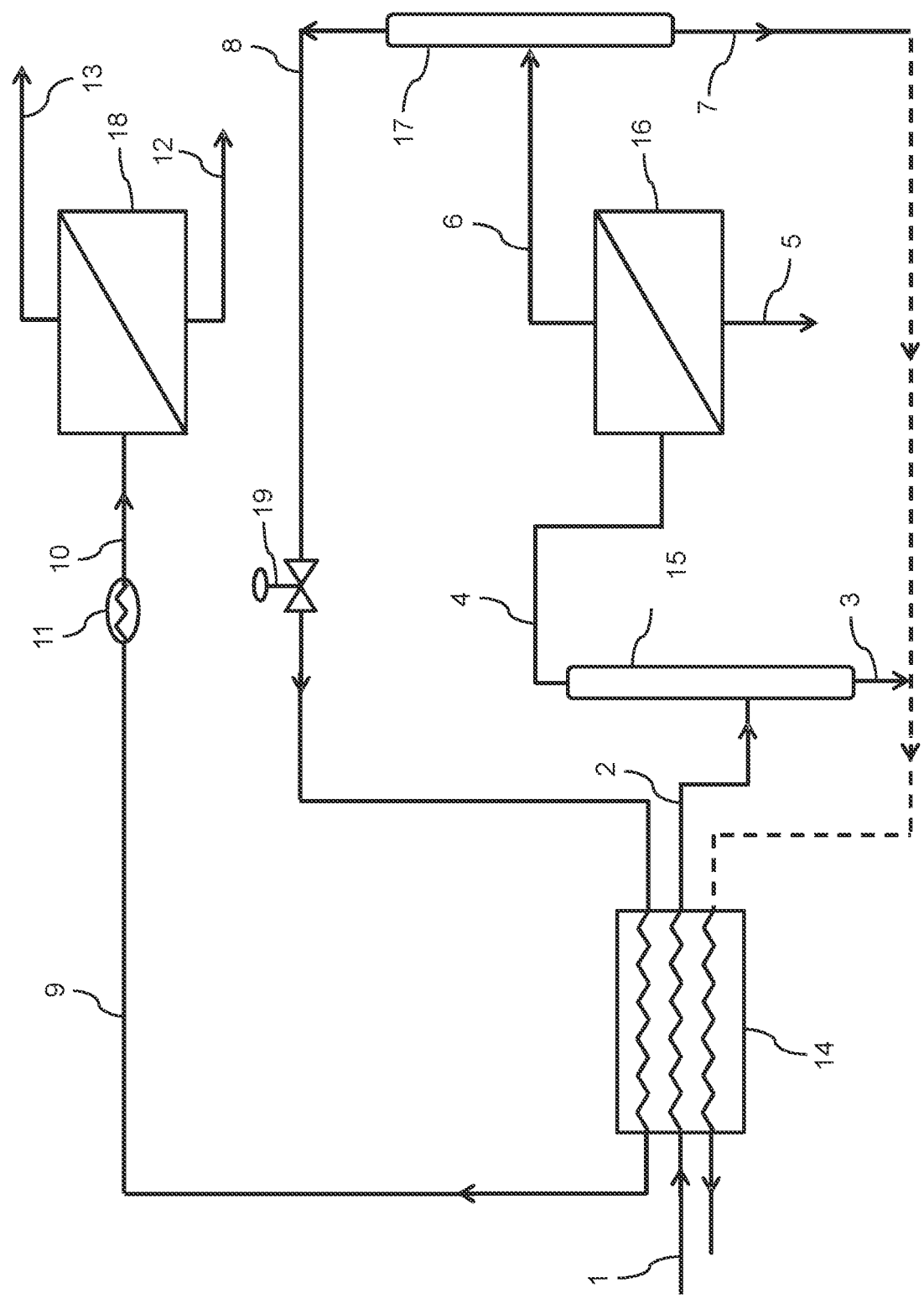

METHOD FOR PURIFYING NATURAL GAS USING AN ECONOMIZER

CROSS REFERENCE TO RELATED APPLICATIONS

This application is a 371 of International PCT Application No. PCT/FR2018/051877, filed Jul. 23, 2018, which claims priority to French Patent Application No. 1757154, filed Jul. 27, 2017, the entire contents of which are incorporated herein by reference.

BACKGROUND

The present invention relates to a process for purifying a hydrocarbon stream such as natural gas.

Crude natural gas may contain a large number of troublesome impurities to be removed. Carbon dioxide is an example of such. Above a certain concentration of $CO_2$ in natural gas, said gas typically cannot be marketed on account of its low calorific power. Several technologies exist for removing $CO_2$ from natural gas. When the content is relatively low (for example less than 10%), washing with amines is usually used. One of the weak points of this solution is the energy required to regenerate the amines which have absorbed the $CO_2$. When the content is higher, this technology becomes prohibitive in terms of operating costs, for example.

Another known and more suited solution is the use of membranes for removing $CO_2$. This technology in itself is inexpensive, but requires systems for pretreating the gas to be treated with the membranes that are often very complex and expensive, in particular for removing heavy hydrocarbons and aromatics.

The typical scheme for extracting $CO_2$ from natural gas with membranes involves the preliminary use of adsorption systems to remove the heavy hydrocarbons, for example. The document *Recent Developments in $CO_2$ Removal Membrane Technology by David Dortmundt and Kishore Doshi* (1999 UOP LLC) explains various possible optimizations of such systems, but the idea of not using an adsorption system is never mentioned. The problem with adsorption solutions is that it is necessary to install an intermittent system requiring a large amount of equipment (heaters, blowers, coolers, etc.).

SUMMARY

The inventors of the present invention have developed a solution for removing the $CO_2$ contained in a natural gas stream to be liquefied, minimizing the losses of methane during this removal while simultaneously minimizing the costs involved in the deployment of purification processes of this type.

One subject of the present invention is a process for purifying a gaseous feed stream of gaseous of natural gas comprising methane, $CO_2$ and hydrocarbons containing at least two carbon atoms, comprising the following steps:

Step a): Cooling the gaseous feed stream in a heat exchanger;

Step b): Introducing the stream obtained from step a) into a phase-separating chamber to produce a liquid stream depleted in methane and enriched in hydrocarbons containing more than three carbon atoms and a gaseous stream;

Step c): Separating the gaseous stream obtained from step b) in a first membrane permeation unit including at least one main membrane separation stage from which emerges at least one $CO_2$-enriched gaseous permeate stream and a partially condensed residual stream depleted in $CO_2$ and enriched in methane;

Step d): Introducing the residual stream obtained from step c) into a phase-separating chamber to produce at least two phases, namely a liquid stream including at least 0.5 mol % and preferably at least 1 mol % of hydrocarbons containing at least three carbon atoms initially contained in the feed stream, and a gaseous stream;

Step e): Heating the gaseous stream obtained from step d) by introducing it into the heat exchanger used in step a) counter-currentwise relative to the feed stream so as to produce a gaseous stream depleted in $CO_2$ and enriched in methane relative to the feed stream.

According to other embodiments, a subject of the invention is also:

A process as defined previously, also comprising step f): introducing the gaseous stream obtained from step e) into a second membrane separation unit, from which emerges at least one gaseous permeate stream enriched in $CO_2$ and a gaseous residual stream depleted in $CO_2$ and enriched in methane.

A process as defined previously, characterized in that the residual stream contains less than 8 mol % of $CO_2$ and more than 80 mol % of methane.

A process as defined previously, characterized in that the gaseous stream obtained from step d) undergoes Joule-Thomson expansion prior to step e).

A process as defined previously, characterized in that the feed stream to be purified comprises at least 15 mol % of $CO_2$.

A process as defined previously, characterized in that the gaseous stream obtained from step e) is heated by introducing it into a heating means so as to produce a gaseous stream prior to step f).

A process as defined previously, characterized in that the liquid stream obtained from step b) is introduced into the heat exchanger used in step a) counter-currentwise relative to the feed stream.

A process as defined previously, characterized in that the liquid stream obtained from step b) is mixed with the liquid stream obtained from step b) before being introduced into the heat exchanger used in step a) counter-currentwise relative to the feed stream.

The invention is particularly advantageous for a gas field including a lot of $CO_2$.

The hydrocarbon stream is generally a stream of natural gas obtained from a nearby gas field. It may also be a domestic gas network in which the gas is distributed via gas pipelines.

The term "natural gas" as used in the present patent application relates to any composition containing hydrocarbons, including at least methane.

The heat exchanger may be any heat exchanger, any unit or other arrangement suitable for allowing the passage of a certain number of streams, and thus allowing direct or indirect exchange of heat between one or more refrigerant fluid lines and one or more feed streams.

Usually, the natural gas stream is essentially composed of methane. Depending on the source, the natural gas contains amounts of hydrocarbons heavier than methane, for instance ethane, propane, butane and pentane and also certain aromatic hydrocarbons. The natural gas stream also contains non-hydrocarbon products, such as nitrogen or other impurities $H_2O$, $CO_2$, $H_2S$ and other sulfur-based compounds, mercury and others.

The first membrane separation unit used in step c) has a higher permeation capacity for $CO_2$ than for methane (high $CO_2$/methane selectivity) and functions in the presence of liquid.

The second membrane separation unit used in step f) is more selective for $CO_2$ than for methane and more selective for methane than for heavy hydrocarbons. The $CO_2$/methane selectivity is higher than for the first membrane unit. Moreover, this second membrane unit does not function in the presence of liquid.

An implementation example is illustrated in the FIGURE by the example that follows,

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein:

The FIGURE illustrates one embodiment of the present invention.

DETAILED DESCRIPTION OF THE PREFERRED EMBODIMENTS

In the FIGURE, a natural gas feed stream 1 is introduced into a heat exchanger 14 at a temperature T1.

Typically, the feed stream 1 comprises at least 50 mol % of methane and at least 20 mol % of $CO_2$.

A partially condensed stream 2 leaves the heat exchanger 14 at a temperature T2 below T1.

Stream 2 is introduced into a phase-separating chamber 15, from which emerges a liquid stream 3 and a gaseous stream 4.

The gaseous stream 4 is then introduced into a first membrane separation unit 16 having a higher selectivity for $CO_2$ than for methane and functioning in the presence of liquid. In this membrane unit, the stream is separated into a gaseous permeate stream 5 which is highly enriched in $CO_2$ and a residual stream 6 which is partially condensed at a temperature T3 below T2.

Stream 6 is introduced into a phase-separating chamber 17. A liquid stream 7 emerges therefrom, including at least 0.5 mol %, preferably at least 1% mol of hydrocarbons containing at least three carbon atoms initially contained in the feed stream 1. A gaseous stream 8 having a hydrocarbon dew point at least 2° C. lower than the feed stream (at an equivalent pressure), preferentially at least 5° C. lower (at an equivalent pressure) and more preferentially at least 10° C. lower, also emerges from the phase-separating chamber 17.

The gaseous stream 8 is then heated 9 in the heat exchanger 14 up to a temperature quite close to T1 (i.e. to a temperature strictly greater than T2 and at least between T2 and T1). Before being introduced into the heat exchanger 14, stream 8 is optionally expanded, for example by means of a Joule-Thomson valve 19. Stream 8 heats up in the heat exchanger in a counter-current relative to the feed stream 1, which, itself, is cooled to the temperature T2. Stream 9 exiting the exchanger 14 is then introduced at a temperature T4 into a second membrane separation unit 18 after having been heated in a heating means 11.

Typically, stream 9 is heated (it then becomes stream 10) by about 30° C. to 50° C. (i.e.: the difference between T1 and T4 is between 30° C. and 50° C.). The passage of stream 10 through unit 18 results in a gaseous residual stream 13 depleted in $CO_2$ and enriched in methane and also a permeate stream 12 enriched in $CO_2$ and depleted in hydrocarbons.

Typically, stream 13 includes less than 8 mol % of $CO_2$ and more than 80 mol % of methane and stream 12 includes at least 40 mol % of $CO_2$.

The membrane unit 18 comprises at least one membrane that is selective for $CO_2$ but not selective for heavy hydrocarbons (of "glassy membrane" type, i.e. a membrane that is more selective for $CO_2$ than for methane and more selective for methane than for heavy hydrocarbons). This membrane unit 18 does not function in the presence of liquid.

The liquid streams 3 and 7 may be introduced, independently or after having been mixed, into the heat exchanger 14 in order to be heated and to serve to cool the feed stream 1, and then, at the outlet, to be mixed again with the feed stream in order to be recycled.

The implementation of an embodiment according to the invention as described with the FIGURE is illustrated by the following summary table (in the material balance below, the liquids 3 and 5 are not heated in the exchanger to simplify the heat exchanger 14, although it may be possible to do so in order to further improve the performance of the system):

|  |  | -1- | -2- | -3- | -4- | -5- | -6- | -7- |
|---|---|---|---|---|---|---|---|---|
| Vapour fraction | % mol | 1.000 | 0.997 | 0.000 | 1.000 | 1.000 | 0.997 | 0.000 |
| Temperature | ° C. | 26.6 | 18.0 | 18.0 | 18.0 | 15.9 | 13.6 | 13.6 |
| Pressure | bara | 62.8 | 62.5 | 62.5 | 62.5 | 1.3 | 62.5 | 62.5 |
| Flow rate | Nm3 h | 4469 | 4469 | 13 | 4456 | 508 | 3948 | 10 |
| Composition |  |  |  |  |  |  |  |  |
| Methane | Mol % | 62.64% | 62.64% | 17.85% | 62.78% | 24.53% | 67.70% | 22.66% |
| Ethane | Mol % | 2.51% | 2.51% | 2.72% | 2.51% | 0.50% | 2.77% | 3.61% |
| Propane | Mol % | 1.84% | 1.84% | 5.26% | 1.83% | 0.25% | 2.03% | 7.13% |
| i-Butane | Mol % | 0.61% | 0.61% | 3.49% | 0.61% | 0.02% | 0.68% | 4.79% |
| n-Butane | Mol % | 0.54% | 0.54% | 3.99% | 0.52% | 0.02% | 0.59% | 5.49% |
| i-Pentane | Mol % | 0.22% | 0.22% | 3.15% | 0.21% | 0.00% | 0.24% | 4.28% |
| n-Pentane | Mol % | 0.17% | 0.17% | 3.07% | 0.16% | 0.00% | 0.18% | 4.15% |
| n-Hexane | Mol % | 0.15% | 0.15% | 6.00% | 0.13% | 0.00% | 0.15% | 7.59% |
| CO2 | Mol % | 29.34% | 29.34% | 18.34% | 29.37% | 73.23% | 23.73% | 17.48% |
| Nitrogen | Mol % | 1.67% | 1.67% | 0.19% | 1.67% | 1.18% | 1.74% | 0.22% |
| n-Heptane | Mol % | 0.13% | 0.13% | 10.75% | 0.10% | 0.00% | 0.11% | 11.69% |
| H2S | Mol % | 0.00% | 0.00% | 0.00% | 0.00% | 0.00% | 0.00% | 0.00% |
| H2O | Mol % | 0.09% | 0.09% | 11.82% | 0.06% | 0.27% | 0.03% | 0.03% |
| n-Octane | Mol % | 0.09% | 0.09% | 13.36% | 0.05% | 0.00% | 0.06% | 10.87% |

-continued

|  | -8- | -9- | -10- | -11- | -12- | -13- |
|---|---|---|---|---|---|---|
| Vapour fraction | 1.000 | 1.000 | 1.000 | 1.000 | 1.000 | 1.000 |
| Temperature | 13.6 | 24.0 | 64.0 | 64.0 | 58.3 | 52.7 |
| Pressure | 62.5 | 62.2 | 61.7 | 61.7 | 1.3 | 61.6 |
| Flow rate | 3938 | 3935 | 3935 | 3935 | 1192 | 2743 |
| Composition |  |  |  |  |  |  |
| Methane | 67.82% | 67.85% | 67.85% | 67.85% | 29.29% | 84.61% |
| Ethane | 2.76% | 2.77% | 2.77% | 2.77% | 0.25% | 3.86% |
| Propane | 2.02% | 2.02% | 2.02% | 2.02% | 0.04% | 2.88% |
| i-Butane | 0.67% | 0.67% | 0.67% | 0.67% | 0.01% | 0.96% |
| n-Butane | 0.58% | 0.58% | 0.58% | 0.58% | 0.01% | 0.83% |
| i-Pentane | 0.22% | 0.22% | 0.22% | 0.22% | 0.00% | 0.32% |
| n-Pentane | 0.17% | 0.17% | 0.17% | 0.17% | 0.00% | 0.25% |
| n-Hexane | 0.13% | 0.13% | 0.13% | 0.13% | 0.00% | 0.18% |
| CO2 | 23.74% | 23.70% | 23.70% | 23.70% | 69.17% | 3.94% |
| Nitrogen | 1.74% | 1.74% | 1.74% | 1.74% | 1.13% | 2.01% |
| n-Heptane | 0.08% | 0.08% | 0.08% | 0.08% | 0.00% | 0.12% |
| H2S | 0.00% | 0.00% | 0.00% | 0.00% | 0.00% | 0.00% |
| H2O | 0.03% | 0.03% | 0.03% | 0.03% | 0.10% | 0.00% |
| n-Octane | 0.03% | 0.03% | 0.03% | 0.03% | 0.00% | 0.05% |

To illustrate the main advantage of the invention, the hydrocarbon dew point (in ° C. at the pressure of the fluid) of the gas in the main points is calculated below (it may be observed that the dew point of product 13 is significantly lower than the temperature, which is critical for ensuring that no liquid forms anywhere in the second membrane):

Feed (stream 1): 26.6° C.
Stream 8: 13.6° C.
Stream 13: 25° C.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for purifying a gaseous feed stream of natural gas comprising methane, $CO_2$ and hydrocarbons containing at least two carbon atoms, comprising the following steps:

Step a): cooling the gaseous feed stream in a heat exchanger;

Step b): introducing stream obtained from step a) into a phase-separating chamber to produce a liquid stream depleted in methane and enriched in hydrocarbons containing more than three carbon atoms and a gaseous stream;

Step c): separating the gaseous stream obtained from step b) in a first membrane permeation unit including at least one main membrane separation stage from which emerges at least one $CO_2$-enriched gaseous first permeate stream and a partially condensed first residual stream depleted in $CO_2$ and enriched in methane;

Step d): introducing the first residual stream obtained from step c) into a phase-separating chamber to produce at least two phases, a liquid stream including at least 0.5 mol % of hydrocarbons containing at least three carbon atoms initially contained in the feed stream, and a gaseous stream;

Step e): heating the gaseous stream obtained from step d) by introducing it into the heat exchanger used in step a) counter-currentwise relative to the feed stream so as to produce a gaseous stream depleted in $CO_2$ and enriched in methane relative to the feed stream; and Step f): introducing the gaseous stream obtained from step e) into a second membrane separation unit, from which emerges at least one gaseous second permeate stream enriched in $CO_2$ and a gaseous second residual stream depleted in $CO_2$ and enriched in methane.

2. The process as claimed in in claim 1, wherein the second residual stream contains less than 8 mol % of $CO_2$ and more than 80 mol % of methane.

3. The process as claimed in claim 1, wherein the gaseous stream obtained from step d) undergoes Joule-Thomson expansion prior to step e).

4. The process as claimed in claim 1, wherein the feed stream to be purified comprises at least 15 mol % of $CO_2$.

5. The process as claimed in claim 1, wherein the gaseous stream obtained from step e) is heated by introducing it into a heating means so as to produce a gaseous stream prior to step f).

6. The process as claimed in claim 1, wherein the liquid stream obtained from step b) is introduced into the heat exchanger used in step a) counter-currentwise relative to the feed stream.

7. The process as claimed in claim 1, wherein the liquid stream obtained from step d) is mixed with the liquid stream obtained from step b) before being introduced into the heat exchanger used in step a) counter-currentwise relative to the feed stream.

* * * * *